US011203333B2

(12) United States Patent
Kennedy et al.

(10) Patent No.: US 11,203,333 B2
(45) Date of Patent: Dec. 21, 2021

(54) APPARATUS FOR CONTROLLING A TRAILER PARKING BRAKE STATUS INDICATOR IN A TRACTOR

(71) Applicant: Bendix Commercial Vehicle Systems LLC, Elyria, OH (US)

(72) Inventors: Andrew L. Kennedy, Lakewood, OH (US); Christopher H. Hutchins, Bay Vilage, OH (US); Daniel P. Zula, North Ridgeville, OH (US); Girish Barade, Westlake, OH (US); Thomas J. Weed, North Ridgeville, OH (US); Linda J. Burns, Elyria, OH (US); Rebecca J. Carter, Medina, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 146 days.

(21) Appl. No.: 16/161,222

(22) Filed: Oct. 16, 2018

(65) Prior Publication Data
US 2020/0114896 A1 Apr. 16, 2020

(51) Int. Cl.
*B60T 17/22* (2006.01)
(52) U.S. Cl.
CPC ........... *B60T 17/22* (2013.01); *B60T 2250/04* (2013.01)
(58) Field of Classification Search
None
See application file for complete search history.

(56) References Cited

U.S. PATENT DOCUMENTS

| 4,965,461 | A | 10/1990 | McRoberts, Jr. et al. |
| 5,061,015 | A | 10/1991 | Cramer et al. |
| 6,450,587 | B1 * | 9/2002 | MacGregor ............... B60T 7/10 |
| 6,535,113 | B1 | 3/2003 | Gravolin |

(Continued)

FOREIGN PATENT DOCUMENTS

| DE | 10 2010 063 372 A1 | 6/2012 |
| KR | 10-2008-0009338 A | 1/2008 |
| WO | 91/16223 A1 | 10/1991 |

OTHER PUBLICATIONS

Machine Translation of DE 10 2010 063 372 A1.
(Continued)

*Primary Examiner* — Yuen Wong
*Assistant Examiner* — Hongye Liang
(74) *Attorney, Agent, or Firm* — Reising Ethington P.C.

(57) ABSTRACT

An apparatus for controlling a trailer parking brake status indicator in a tractor is provided that allow an operator to deactivate the indicator when the tractor is operating without a trailer using a pre-existing operator interface. The apparatus includes means for determining whether a trailer is coupled to the tractor and a controller configured to execute, when a determination whether the trailer is coupled to the tractor cannot be made, a process for controlling activation and deactivation of the indicator. The process includes determining whether a speed of the tractor meets a predetermined condition relative to a predetermined speed. The process further includes monitoring, after determining that the speed of the tractor meets the predetermined condition relative to the predetermined speed, for an activation command to activate a parking brake on the trailer. The process further includes deactivating the trailer parking brake status indicator responsive to the activation command.

19 Claims, 2 Drawing Sheets

(56) References Cited

U.S. PATENT DOCUMENTS

| | | | |
|---|---|---|---|
| 8,463,519 B2 | 6/2013 | McCann | |
| 10,471,785 B1 * | 11/2019 | Murad | B60W 50/14 |
| 2006/0097569 A1 | 5/2006 | Eberling et al. | |
| 2007/0046098 A1 | 3/2007 | Grolle et al. | |
| 2011/0147142 A1 | 6/2011 | Standen | |
| 2017/0137002 A1 | 5/2017 | Taneyhill et al. | |
| 2018/0086321 A1 | 3/2018 | Zula et al. | |
| 2018/0086322 A1 | 3/2018 | Zula et al. | |

OTHER PUBLICATIONS

Machine Translation of KR 10-2008-0009338 A.
International Search Report issued in corresponding International (PCT) Patent Application No. PCT/US2019/055100 (Feb. 4, 2020).
Written Opinion issued in corresponding International (PCT) Patent Application No. PCT/US2019/055100 (Feb. 4, 2020).

* cited by examiner

APPARATUS FOR CONTROLLING A TRAILER PARKING BRAKE STATUS INDICATOR IN A TRACTOR

BACKGROUND OF THE INVENTION a. Field of the Invention

This invention relates to an apparatus and method for controlling a trailer parking brake status indicator in a tractor. In particular, this invention relates to an apparatus and method for deactivating the indicator when the tractor is operating without a trailer.

b. Background Art

Many conventional tractors include a visual indicator, or tell-tale, that is illuminated when the parking brake for a trailer coupled to the tractor is applied. Control of the indicator is based on fluid pressure levels in a fluid conduit extending between the tractor and trailer. In particular, when a vehicle operator wants to apply the trailer parking brake, fluid pressure in the conduit used to control service braking is evacuated from the conduit to allow the spring parking brake to be applied. The absence of fluid pressure in the conduit is sensed and the indicator is illuminated to indicate that the trailer parking brake has been applied. An absence of fluid pressure in the conduit also exists, however, when the tractor is operating without a trailer (i.e., in a bobtail configuration) because no fluid pressure is required for service braking in the trailer and, therefore, no fluid pressure is supplied to the conduit between the tractor and trailer. As a result, in conventional tractors the indicator remains constantly illuminated when the tractor is being operated without a trailer. The constant illumination is annoying and distracting to the vehicle operator—particularly at night.

The inventors herein have recognized a need for an apparatus and method for controlling a trailer parking brake status indicator in a tractor that will minimize and/or eliminate one or more of the above-identified deficiencies.

BRIEF SUMMARY OF THE INVENTION

This invention relates to an apparatus and method for controlling a trailer parking brake status indicator in a tractor. In particular, this invention relates to an apparatus and method for deactivating the indicator when the tractor is operating without a trailer.

An apparatus for controlling a trailer parking brake status indicator in a tractor in accordance with one embodiment includes means for determining whether a trailer is coupled to the tractor. The apparatus further includes a controller configured to execute, when a determination whether the trailer is coupled to the tractor cannot be made, a process including determining whether a speed of the tractor meets a predetermined condition relative to a predetermined speed. The process further includes monitoring, after determining that the speed of the tractor meets the predetermined condition relative to the predetermined speed, for an activation command to activate a parking brake on the trailer. The process further includes deactivating the trailer parking brake status indicator responsive to the activation command.

An article of manufacture in accordance with one embodiment includes a non-transitory computer storage medium having a computer program encoded thereon that when executed by a controller controls a trailer parking brake status indicator in a tractor. The computer program includes code for executing, when a determination whether a trailer is coupled to the tractor cannot be made, a process including determining whether a speed of the tractor meets a predetermined condition relative to a predetermined speed. The process further includes monitoring, after determining that the speed of the tractor meets the predetermined condition relative to the predetermined speed, for an activation command to activate a parking brake on the trailer. The process further includes deactivating the trailer parking brake status indicator responsive to the activation command.

A method for controlling a trailer parking brake status indicator in a tractor in accordance with one embodiment includes the step of determining, when a determination whether a trailer is coupled to the tractor cannot be made, whether a speed of the tractor meets a predetermined condition relative to a predetermined speed. The method further includes the step of monitoring, after determining that the speed of the tractor meets the predetermined condition relative to the predetermined speed, for an activation command to activate a parking brake on the trailer. The method further includes the step of deactivating the trailer parking brake status indicator responsive to the activation command.

An apparatus and method for controlling a trailer parking brake status indicator in a tractor in accordance the present teachings represent an improvement as compared to conventional systems and methods. In particular, the apparatus and method enable a vehicle operator to deactivate the trailer parking brake status indicator when the tractor is operating without a trailer despite the absence of fluid pressure in the conduits between the tractor and trailer that would normally be indicative of application of the trailer parking brake. As a result, a potential distraction and annoyance for the vehicle operator may be eliminated. In addition, the apparatus and method enable the vehicle operator to achieve this result while using existing user interface elements that are used to apply and release parking brakes in the vehicle.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
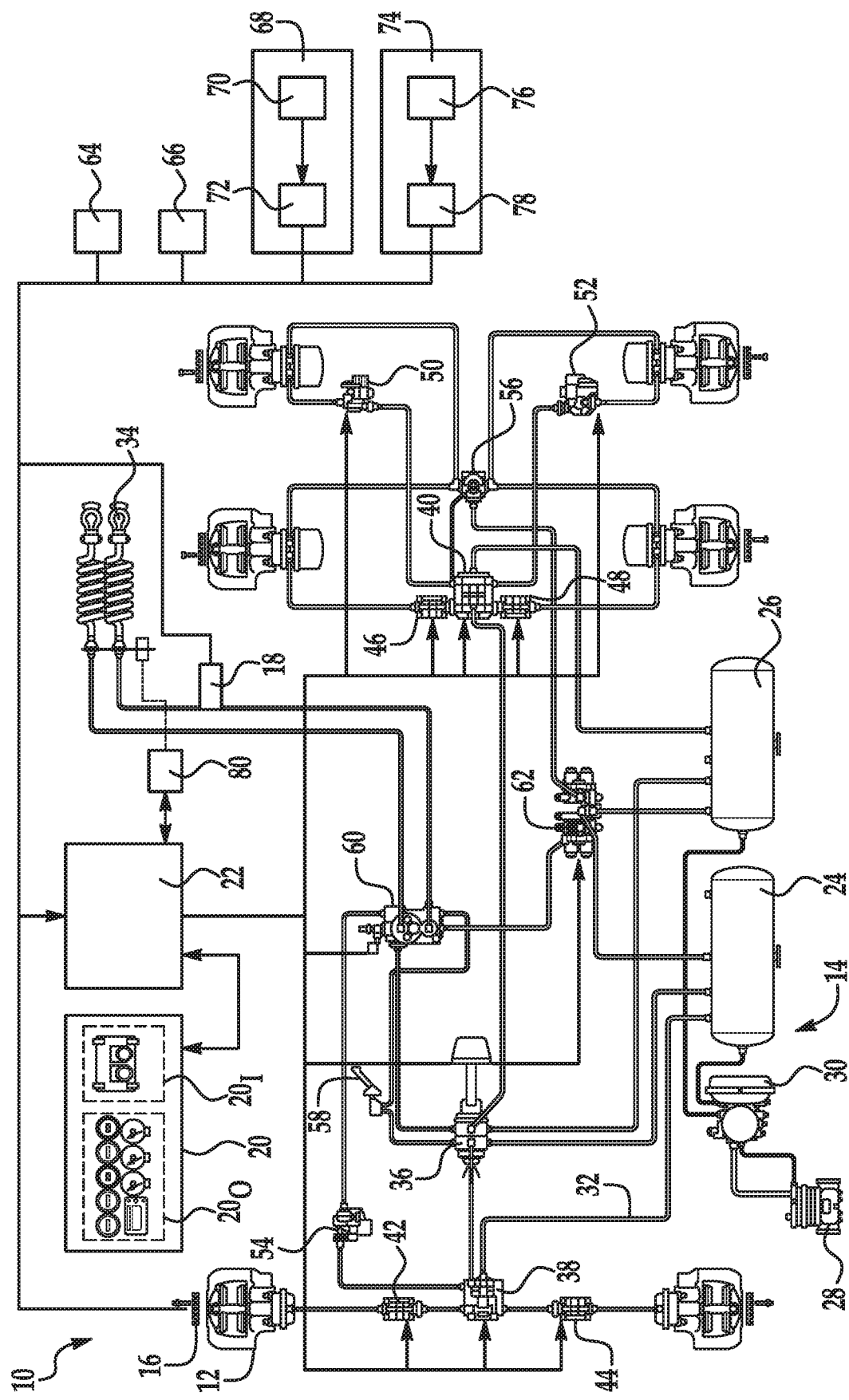
FIG. 1 is a diagrammatic view of a tractor incorporating a system for controlling wheel brakes on the tractor and one embodiment of a system for controlling a trailer parking brake status indicator in the tractor.

Referring now to the drawings wherein like reference numerals are used to identify identical components in the various views, FIG. 1 illustrates a braking system 10 configured to brakes wheels on a vehicle in order to slow or stop movement of the vehicle. In the illustrated embodiment, the vehicle comprises a tractor, or power unit, of a tractor-trailer. Depending on the application, the tractor may be operated in a bobtail configuration without any trailers, or towed units, coupled to the tractor or may be operated as a tractor-trailer with one or more trailers coupled to the tractor. It should be understood that many of the components in braking system 10 may also be used to control wheel brakes in any trailers coupled to the tractor. Braking system 10 may be configured to communicate with other vehicle systems over a conventional vehicle communication bus such as a controller area network (CAN) (or another communication medium such as power line communication (PLC)) including, for example, advanced driver assistance systems such as collision avoidance systems that are configured to implement automated emergency braking (AEB) of the vehicle wheels under certain conditions. Braking system 10 may include wheel brakes 12, a fluid circuit 14 that supplies fluid pressure to wheel brakes 12, various sensors including sensors 16, 18, a user interface 20, and one or more controllers 22.

Wheel brakes 12 are configured to apply a braking force to one or more wheels. In the illustrated embodiment, brakes 12 comprise disc brakes in which a carrier supports brake pads on opposite sides of a rotor rotating with the wheel and an actuator causes, responsive to fluid pressure delivered by fluid circuit 14, movement of a caliper relative to the carrier to move the brake pads into and out of engagement with the rotor. It should be understood, however, that one or more of wheel brakes 12 may alternatively comprise drum brakes in which an actuator such as a cam or piston causes, responsive to fluid pressure delivered by fluid circuit 14, movement of one or more brake shoes into engagement with a braking surface in a brake drum rotating with the wheel.

Fluid circuit 14 generates fluid pressure within system 10 and controls the delivery of fluid pressure to the actuator of each wheel brake 12. Circuit 14 may include components for generating and storing pressurized fluid including fluid reservoirs 24, 26, a compressor 28, and air dryer 30 and components for routing and delivering fluid pressure to wheel brakes 12 including fluid conduits 32, glad-hand connectors 34 between the tractor and trailers, and various valves including food pedal valve 36, relay valves 38, 40, modulator valves 42, 44, 46, 48, 50, 52, 54, quick release valve 56, trailer control valve 58, tractor protection valve 60 and parking control valve 62.

Fluid reservoirs 24, 26 store compressed fluid for use in applying wheel brakes 12. Reservoir 24 supplies pressurized fluid to the wheel brakes 12 for the steer axle and has a fluid port coupled to air dryer 30 and fluid ports coupled to foot pedal valve 36, relay valve 38 and parking control valve 62. Reservoir 26 supplies pressurized fluid to the wheel brakes for the drive axles and has a fluid port coupled to air dryer 30 and fluid ports coupled to foot pedal valve 36, relay valve 40, and parking control valve 62.

Compressor 28 draws in air and compresses the air for delivery to reservoirs 24, 26 through air dryer 30. Compressor 28 has one or more fluid ports coupled to air dryer 30.

Air dryer 30 is provided to collect and remove solid, liquid and vapor contaminants from pressurized fluid. Air dryer 30 is disposed between compressor 28 and reservoirs 24, 26 and has fluid ports coupled to compressor 28 and each reservoir 24, 26.

Fluid conduits 32 are used to transport fluid between reservoirs 24, 26 compressor 28, air dryer 30, glad hand connectors 34, valves 36, 38, 40, 42, 44, 46, 48, 50, 52, 54, 56, 58, 60, 62. and wheel brakes 12. Conduits 32 may be made from conventional metals and/or plastics and have connectors at either end configured to join the conduits 32 to corresponding components of circuit 14.

Glad-hand connectors 34 are used to transmit pressurized fluid from the tractor to any trailers. One of connectors 34 is used to transmit fluid used during service braking while the other connector 34 is used to transmit fluid during emergency (or parking) braking.

Valves 36, 38, 40, 42, 44, 46, 48, 50, 52, 54, 56, 58, 60, 62 are provided to control distribution of fluid throughout fluid control circuit 14. Foot pedal valve 36 is provided to allow controlled application of the brakes 12 by the vehicle operator by selectively releasing fluid pressure from fluid reservoirs 24, 26 and is supported within the cabin of the vehicle. Actuation of valve 36 by the vehicle operator allows fluid pressure to flow from reservoirs 24, 26 to relay valves 38, 40, trailer control valve 58 and tractor protection valve 60. Relay valves 38, 40 increase the volume of fluid, and therefore the speed, at which fluid is delivered to, and exhausted from, wheel brakes 12 in order to eliminate lag times between the commanded and actual application and release of brakes 12. Relay valves 38, 40 may operate under the control of controller 22 to implement service braking, traction control and stability control when required. Modulator valves 42, 44, 46, 48, 50, 52, 54 are provided to implement an anti-lock braking function. During normal braking, valves 42, 44, 46, 48, 50, 52, 54 allow fluid pressure to pass from relay valves 38, 40 to wheel brakes 12 without interference. During a loss of traction, however, signals from controller 22 cause valves 42, 44, 46, 48, 50, 52, 54 to modulate the fluid pressure to prevent lockup of the wheels. Quick release valve 56 increases the speed at which fluid pressure is exhausted from wheel brakes 12 on the drive axle when brakes 12 are released. Trailer control valve 58 allows the vehicle operator to control wheel brakes on the trailer(s) independent of the wheel brakes 12 on the tractor. Valve 58 may be mounted within the cab of tractor and permits delivery of fluid directly from reservoir 24 to tractor protection valve 60 for delivery to wheel brakes in the trailer(s). Tractor protection valve 60 transmits pneumatic signals relating to operation of the trailer wheel brakes from the tractor to the trailer. Valve 60 also protects the fluid supply for the tractor in the event of a brake in the fluid connection between the tractor and trailer. Parking control valve 62 delivers fluid to, and exhausts fluid from, wheel brakes 12 on both the drive axles in the tractor and the trailer axles in the trailer(s) (through tractor protection valve 60 and glad hand connector 34) in order to implement parking brakes in the tractor and trailer(s). When valve 62 delivers fluid pressure to an actuator for a wheel brake 12, the fluid pressure opposes a spring force in the actuator to release the parking brake. When valve 62 exhausts fluid from the actuator for the wheel brake 12, the spring force sets the parking brake. Valve 62 may operate under the control of controller 22.

Sensors 16, 18 are provided to identify various conditions associated with the vehicle and surrounding environment that impact the operation of braking system 10. Sensors 16 comprise a wheel speed sensors that generate signals indicative of the rotational speed of a corresponding wheel and from which controller 22 can determine the speed of the vehicle and whether certain wheels are slipping and implement anti-lock braking through control of relay valves 38, 40 and modulator valves 42, 44, 46, 48, 50, 52, 54. Sensor 18 comprises a pressure sensor that generate signals indicative of the fluid pressure within a fluid conduit extending between tractor protection valve 60 and glad hand connector 34. Additional pressure sensors may be located at various locations throughout fluid circuit 14. In conventional systems, the output of sensor 18 may be used to control a visual indicator, or tell-tale, that is illuminated when the parking brake in a trailer coupled to the tractor is applied. In particular, when a vehicle operator wants to apply the trailer parking brake, fluid pressure in the conduit is evacuated from the conduit to allow the parking brake to be applied. The absence of fluid pressure in the conduit is sensed by sensor 18 and the indicator is illuminated to indicate that the trailer parking brake has been applied. An absence of fluid pressure in the conduit also exists, however, when the tractor is operating without a trailer (i.e., in a bobtail configuration) because no fluid pressure is required for service braking in the trailer and, therefore, no fluid pressure is supplied to the conduit between the tractor and trailer. As a result, in conventional tractors the indicator remains constantly illuminated when the tractor is being operated without a trailer. The constant illumination is annoying and distracting to the vehicle operator—particularly at night. The system and method described herein are intended to address this issue by providing an improved system and method for controlling a trailer parking brake status indicator in a tractor. It should be understood that the above described sensors are exemplary and that additional sensors may be used to identify other conditions that may impact the operation of braking system 10 including, for example, an engine or transmission speed sensor that generates a signal indicative of the speed of the vehicle, a steer angle sensor that generates a signal indicative of a steering angle imparted by a vehicle operator to a steering wheel in the vehicle, a yaw rate sensor that generates a signal indicative of the angular velocity of the vehicle about its vertical (yaw) axis and/or load sensors that generate signals indicative of the forces at various locations on the vehicle.

User interface 20 provides an interface between the vehicle operator and system 10 through which the operator can control certain vehicle braking functions and receive information about vehicle braking. Interface 20 may include various input devices 20i through which the operator can instruct system 10 to perform various braking functions including controlling the fluid pressure provided to brake actuators on the tractor and trailer to release and apply spring brakes acting as parking brakes for the tractor and trailer. Interface 20 may, for example, include one of the interfaces set forth in commonly assigned U.S. patent application Ser. No. 15/713,614 (published as U.S. Pub. No. 2018/0086322 A1), the entire disclosure of which is incorporated herein by reference. Interface 20 may also include various output devices 20o through which the operator is informed of the status of system 10. These output devices 20o may include light emitters, such as light emitting diodes, or sound emitters, such as a speaker, to convey visual and/or audio warnings, status or other information. In the case of visual output devices, information can be conveyed through differences in color, differences in intensity, differences in the number of lights, and differences in the pattern of activation of the lights. In the case of audio output devices, similar information can be conveyed through differences in the type of sound generated, differences in volume and differences in the pattern of sounds. One of the output devices 20o on interface 20 may comprise a trailer parking brake status indicator that indicates the status of a parking brake on the trailer (i.e., whether the parking brake is applied or released). In certain embodiments, the trailer parking brake status indicator may comprise a light emitter that is normally illuminated (activated) when the trailer parking brake is applied and extinguished (deactivated) when the trailer parking brake is released. As discussed above, because conventional systems rely on the absence of fluid pressure in the conduit between the tractor and trailer to indicate application of the trailer parking brake, the trailer parking brake status indicator in conventional systems is also activated whenever the tractor is being operated without a trailer. As a result, in conventional tractors the indicator remains constantly activated when the tractor is being operated without a trailer. The system and method described herein are intended to address this issue by providing an improved system and method for controlling a trailer parking brake status indicator in a tractor.

Controller 22 controls the operation of relay valves 38, 40, modulator valves 42, 44, 46, 48, 50, 52, 54, trailer protection valve 60 and parking control valve 62 in order to control the fluid pressure delivered to wheel brakes 12 and, therefore, the braking force applied to the wheels. Controller 22 also controls the output devices in interface 20 including, in accordance with the present teachings, a trailer parking brake status indicator. Controller 22 may comprise a programmable microprocessor or microcontroller or may comprise an application specific integrated circuit (ASIC). Controller 22 may include a memory and a central processing unit (CPU). Controller 22 may also include an input/output (I/O) interface including a plurality of input/output pins or terminals through which the controller 22 may receive a plurality of input signals and transmit a plurality of output signals. The input signals may include signals received from sensors 16, 18 and input devices 20i user interface 20. The output signals may include signals used to control relay valves 38 40, modulator valves 42, 44, 46, 48, 50, 52, 54, tractor protection valve 60, and parking control valve 62 and signals used to control output devices 20o on user interface 20. Controller 22 may be configured with appropriate programming instructions (i.e., software or a computer program) to implement the control of wheel brakes 12.

In accordance with the present teachings, controller 22 may also be configured with appropriate programming instructions to implement a method for controlling a trailer parking brake status indicator in a tractor. The instructions or computer program may be encoded on a non-transitory computer storage medium such as a memory within, or accessible by, controller 22. Controller 22 may form one part of an apparatus for controlling the trailer parking brake status indicator. The apparatus may further include means for determining whether a trailer is coupled to the tractor. In one embodiment, the determining means may comprise a presence or proximity sensor 64 that is configured to detect the presence of a trailer coupled to the tractor. The sensor 64 may comprise, for example, a radar, lidar, ultrasound or infrared sensor mounted on the tractor and configured to generate an electromagnetic or sonic wave in the direction where a trailer may be located and to receive a reflection of that wave by any trailer coupled to the tractor. In response to the reflected wave, sensor 64 may generate an electrical signal indicative of the presence of a trailer and transmits that signal to controller 22. In another embodiment, the determining means may comprise a fifth wheel or kingpin connection switch 66 configured to detect the presence of a trailer coupled to the tractor. The mechanical switch 66 may be configured to close in the presence of a trailer kingpin within the tractor's fifth wheel coupling and generate and transmit an electrical signal to controller 22 indicative of the presence of the kingpin and, therefore, the trailer. In another embodiment, the determining means may comprise a power management system 68 on the tractor configured to monitor and control electrical current drawn from a power source (e.g., a battery) on the tractor for running various systems on the vehicle. Current levels above a predetermined level may be indicative of the presence of a trailer having various systems (e.g., refrigeration, lights, anti-lock braking systems and/or tire pressure management systems) requiring electricity to operate. System 68 may include one or more current load sensors 70 configured to generate a signal(s) indicative of the level of current required by the vehicle and a controller 72 configured to compare the level of current required against a predetermined current level and to generate and transmit a signal to controller 22 when the level of current meets a predetermined condition relative to the predetermined current level (e.g., exceeds the predetermined current level thereby indicating the presence of additional electrical systems of a trailer). In another embodiment, the determining means may comprise a system 74 for estimating the mass or weight of the vehicle for use in stability control and other applications. Loads or weights above a predetermined level may be indicative of the presence of a trailer coupled to the tractor. System 74 may include one or more load sensors 76 or other sensors used to determine loads applied at various locations on the vehicle and a controller 78 configured to compare the measured load against a predetermined load and to generate and transmit a signal to controller 22 when the measured load meets a predetermined condition relative to the predetermined load (e.g., exceeds the predetermined load thereby indicating the presence of a trailer). In yet another embodiment, the determining means may comprise a communications management system 80 for transmitting and receiving communications between the tractor and any trailers (e.g., through power line communications (PLC)). The receipt of signals from a trailer will be indicative of the presence of the trailer. System 80 may include a controller configured to transmit and receive signals from the tractor and trailer and configured to generate and transmit a control signal to controller 22 upon receipt of a signal from a trailer.

Figure 2:
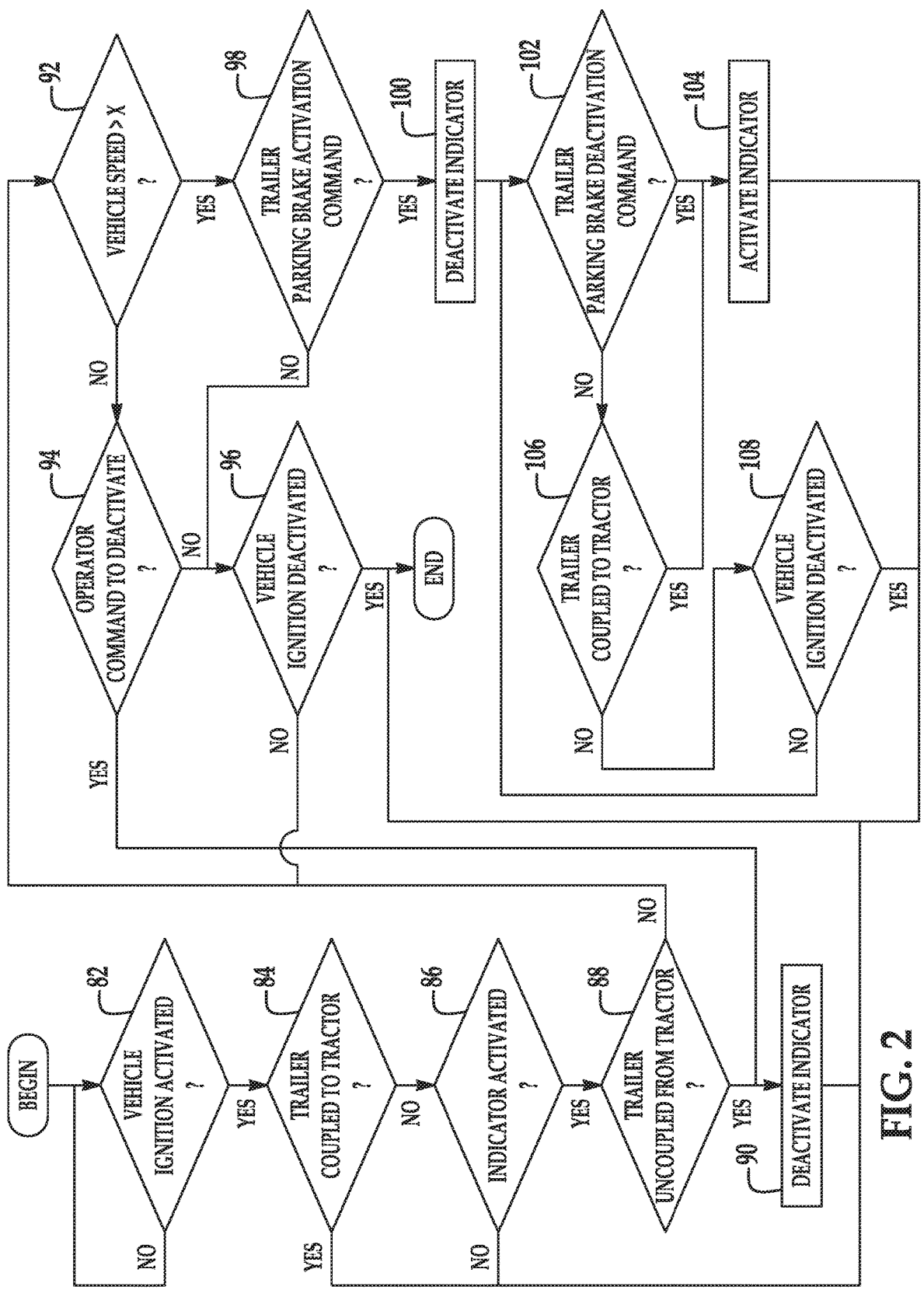
FIG. 2 is a flowchart illustrating one embodiment of a method for controlling a trailer parking brake status indicator in a tractor.

Referring now to FIG. 2, a method for controlling a trailer parking brake status indicator in a tractor operating without a trailer may begin with the step 82 of determining whether an ignition system of the tractor has been activated. Controller 22 may determine that the ignition system for the tractor has been activated in various ways including through inputs from various sensors relating to operation of the engine and exhaust systems that are indicative of ignition of an internal combustion engine or from sensors indicative of a change in electrical current in one or more conductors resulting from activation of the ignition system. If the ignition system has not been activated, controller 22 may continue to monitor for activation of the ignition system. If the ignition system has been activated, controller 22 may proceed to subsequent steps in the method.

Once the ignition system has been activated, the method may continue with the step 84 of determining whether a trailer is unambiguously coupled to the tractor. As set forth hereinabove, the vehicle may include various means for determining whether a trailer is coupled to the tractor including a presence or proximity sensor 64, a fifth wheel or kingpin connection switch 66, a power management system 68, a mass estimating system 74 and/or a communications management system 80. Controller 22 may make a determination, responsive to signals generated by these devices and systems, whether a trailer is coupled to the tractor. Some of these devices and systems may provide a more reliable indicator that a trailer is coupled to the tractor than other devices and systems. For example, the presence of a kingpin indicated by kingpin connection switch may be considered a more reliable indication of the presence of a trailer than an increase in electrical load sensed by power management system 68 which could, for example, result from an improper operating system on the tractor as opposed to the additional electrically powered systems of a trailer. Controller 22 may therefore be configured to accept signals from one or more of sensor 64, switch 66 or systems 68, 74, 80 as a conclusive determination of the presence or absence of a trailer while ignoring others or may be configured to assess the presence or absence of a trailer based on signals from more than one of sensor 64, switch 66 or systems 68, 74, 80 including by weighting those signals equally or differently. The method disclosed herein is intended to allow the vehicle operator to deactivate the trailer parking brake status indicator where no trailer is present. Therefore, if controller 22 determines, beyond a predetermined level of ambiguity, that a trailer is coupled to the tractor, controller 22 may terminate the disclosed process. If controller 22 determines that a trailer is not coupled to the tractor or simply cannot determine whether a trailer is coupled to the tractor, controller 22 may proceed to subsequent steps in the method.

In step 86, controller 22 determines whether the trailer parking brake status indicator is currently activated. Controller 22 may perform this action in a variety of ways. For example, controller 22 may maintain status indicators or flags in a memory for various output devices 20*o* in interface 20 such as the trailer parking brake status indicator. Interface 20 may alternatively provide signals to controller 22 indicative of the status of output devices 20*o* such as the trailer parking brake status indicator. If the trailer parking brake status indicator is not activated, controller 22 may terminate the method. If the trailer parking brake status indicator is activated, controller 22 may proceed to subsequent steps in the method.

Assuming that the trailer parking brake status indicator is activated, the method may continue with the step 88 of determining whether a trailer is unambiguously absent from the tractor. As set forth hereinabove, the vehicle may include various means for determining whether a trailer is coupled to the tractor including a presence or proximity sensor 64, a fifth wheel or kingpin connection switch 66, a power management system 68, a mass estimating system 74 and/or a communications management system 80. Controller 22 may make a determination, responsive to signals generated by these devices and systems, whether a trailer is absent from the tractor. Again, some of these devices and systems may provide a more reliable indicator that a trailer is absent from the tractor than other devices and systems. Controller 22 may therefore be configured to accept signals from one or more of sensor 64, switch 66 or systems 68, 74, 80 as a conclusive determination of the presence or absence of a trailer while ignoring others or may be configured to assess the presence or absence of a trailer based on signals from more than one of sensor 64, switch 66 or systems 68, 74, 80 including by weighting those signals equally or differently. If controller 22 determines, beyond a predetermined level of ambiguity, that a trailer is absent from the tractor, controller 22 may deactivate the indicator in step 90 by generating a signal to interface 20 to deactivate the indicator and terminate the disclosed process. Where the indicator is a visual indicator, controller 22 may, for example, transmit a signal to extinguish the visual indicator.

If controller 22 determines that a trailer is coupled to the tractor or simply cannot determine whether a trailer is coupled to the tractor, controller 22 may proceed to the step 92 of determining whether a speed of the tractor meets a predetermined condition relative to a predetermined speed. For example, controller 22 may determine whether the speed of the tractor exceeds a predetermined speed. Vehicle travel at a speed greater than a predetermined minimum speed indicates that the parking brakes (whether on the tractor or any trailers attached to the tractor) are not currently being applied and, therefore, that the parking brake status indicator should probably not be activated. Controller 22 may determine the speed of the tractor responsive to signals received from wheel speed sensors 16 or other conventional vehicle speed sensors. Depending on the speed of the vehicle, controller 22 may construe inputs from the operator of the vehicle differently.

If the speed of the tractor does not meet the predetermined condition relative to the predetermined speed, controller 22 may perform the step 94 of determining whether the operator of the vehicle has requested deactivation of the trailer parking brake status indicator. Using one or more of the input devices 201 on interface 20, the operator may command controller 22 to deactivate the indicator. The interface 20 will generate a signal to controller 22 in response causing controller 22 to proceed to step 90. The action by the operator will differ from the actions required to generate the activation command or deactivation command described hereinbelow. For example, interface 20 may only generate a command to deactivate the status indicator in this situation if an input device 201 on interface 20 is actuated for a predetermined period of time (longer than necessary to implement the activation or deactivation command described below) or if the operator actuates a single input device 20i or series of input devices 201 in a predefined sequence or manner.

If the operator has not requested deactivation of the trailer parking brake status indicator in step 94, controller 22 may proceed to the step 96 of determining whether the vehicle ignition has been deactivated. If the ignition has been deactivated, controller 22 may terminate the method. If the ignition has not been deactivated, controller 22 may continue to monitor the vehicle speed, returning to step 92. If and when the speed of the tractor meets the predetermined condition relative to the predetermined speed, controller 22 may proceed to subsequent steps in the method.

In step 98, controller 22 monitors for an activation command to activate a parking brake on a trailer. In practicing the disclosed method, controller 22 is configured to interpret a command from a vehicle operator normally used to activate a parking brake on the trailer as a request to deactivate the trailer parking brake status indicator in situations where the tractor is operating without a trailer. As a result, the system and method disclosed herein can be implemented using existing user interface elements and without the need to add additional interface elements. The activation command may be generated responsive to a user input through interface 20. In particular, the vehicle operator may operate an input device 201 of the interface in a manner that would normally be construed as a request to activate the parking brake of a trailer. Interface 20 may generate the activation command responsive to the user input through the interface 20. If an activation command has not been received, controller 22 may again return to step 96.

If an activation command has been received by controller 22 in step 98, the method may continue with the step 100 of deactivating the trailer parking brake status indicator responsive to the parking brake activation command. Controller 22 may generate a signal to interface 20 to deactivate the indicator. Where the indicator is a visual indicator, controller 22 may, for example, transmit a signal to extinguish the visual indicator.

After step 100, controller 22 may perform the step 102 of monitoring for a deactivation command to deactivate the parking brake on the trailer. As in step 98, controller 22 may be configured to interpret a command from a vehicle operator normally used to deactivate or release a parking brake on the trailer as a request to activate the trailer parking brake status indicator in this particular circumstance. The deactivation command may again be generated responsive to a user input through interface 20. In particular, the vehicle operator may operate an input device 201 of the interface in a manner that would normally be construed as a request to deactivate or release the parking brake of a trailer. Interface 20 may generate the deactivation command responsive to the user input. If controller 22 receives a deactivation command, controller 22 may perform the step 104 of activating the trailer parking brake status indicator responsive to the deactivation command. Controller 22 may generate a signal to interface 20 to activate the indicator. Where the indicator is a visual indicator, controller 22 may, for example, transmit a signal to illuminate the visual indicator.

In the absence of a deactivation command in step 102, controller 22 may also perform the step 106 of determining whether a trailer has been coupled to the tractor. As set forth hereinabove, the vehicle may include various means for determining whether a trailer is coupled to the tractor including a presence or proximity sensor 64, a fifth wheel or kingpin connection switch 66, a power management system 68, a mass estimating system 74 and/or a communications management system 80. As in step 84, controller 22 may make a determination in step 106, responsive to signals generated by one or more of these devices and systems, whether a trailer is coupled to the tractor and, in particular, whether a trailer has been coupled to the tractor following the deactivation of the parking brake status indicator in step 100. It should be understood that the determination in step 106 may be made in the same way as in step 84 or in a different way (e.g., by weighting signals from one or more of sensor 64, switch 66 or systems 68, 74, 80 differently than in step 84). If a trailer has been coupled to the tractor, controller 22 may perform step 104 described above. In the illustrated embodiment, steps 102, 106 are performed in succession. It should be understood, however, that controller 22 may alternatively perform steps 102, 106 simultaneously in certain embodiments.

In the absence of either a deactivation command or a determination that a trailer has been coupled to the tractor, controller 22 may perform the step 108 of monitoring for a signal indicating that the ignition system of the tractor has been deactivated. Controller 22 may again determine that the ignition system for the tractor has been deactivated in various ways including through inputs from various sensors relating to operation of the engine and exhaust systems that are indicative of ignition of an internal combustion engine or from sensors indicative of a change in electrical current in one or more conductors resulting from deactivation of the ignition system. If the ignition system has been deactivated, controller 22 may terminate the process. If the ignition system has not been deactivated, controller 22 may return to step 102 to continue monitoring for a deactivation command.

An apparatus and method for controlling a trailer parking brake status indicator in a tractor in accordance the present teachings represent an improvement as compared to conventional systems and methods. In particular, the apparatus and method enable a vehicle operator to deactivate the trailer parking brake status indicator when the tractor is operating without a trailer despite the absence of fluid pressure in the conduits between the tractor and trailer that would normally be indicative of application of the trailer parking brake. As a result, a potential distraction and annoyance for the vehicle operator may be eliminated. In addition, the apparatus and method enable the vehicle operator to achieve this result while using existing user interface elements that are used to apply and release parking brakes in the vehicle.

While the invention has been shown and described with reference to one or more particular embodiments thereof, it will be understood by those of skill in the art that various changes and modifications can be made without departing from the spirit and scope of the invention.

What is claimed is:

1. An apparatus for controlling a trailer parking brake status indicator in a tractor, the trailer parking brake status indicator activated when a trailer is coupled to the tractor and a parking brake on the trailer is applied and deactivated when the trailer is coupled to the tractor and the parking brake on the trailer is released, comprising:
   means for determining whether the trailer is coupled to the tractor, the determining means generating a signal indicative of whether the trailer is coupled to the tractor; and
   a controller configured to
      determine, responsive to the signal, whether a conclusive determination was made regarding whether the trailer is coupled to the tractor; and
      execute, when the controller determines that a conclusive determination was not made responsive to the signal regarding whether the trailer is coupled to the tractor, a process including
         determining whether a speed of the tractor when the tractor is in motion meets a predetermined condition relative to a predetermined speed;
         monitoring, in response to determining that the speed of the tractor meets the predetermined condition relative to the predetermined speed, for an activation command to apply the parking brake on the trailer; and
         deactivating the trailer parking brake status indicator responsive to the activation command.

2. The apparatus of claim 1 wherein the controller is further configured to execute the process only when the trailer parking brake status indicator is activated.

3. The apparatus of claim 1 wherein the controller is further configured to execute the process only after an ignition system of the tractor is activated.

4. The apparatus of claim 1 wherein the process further includes:
   monitoring, after deactivating the trailer parking brake status indicator, for a deactivation command to release the parking brake on the trailer; and
   activating the trailer parking brake status indicator responsive to the deactivation command.

5. The apparatus of claim 1 wherein the process further includes:
   monitoring, after deactivating the trailer parking brake status indicator, for a signal indicating that an ignition system of the tractor is deactivated; and
   activating the trailer parking brake status indicator responsive to the signal.

6. The apparatus of claim 1, further including a user interface configured to generate the activation command responsive to a user input.

7. The apparatus of claim 6 wherein the user interface generates the activation command only when the user input is active for at least a predetermined period of time.

8. An article of manufacture, comprising:
   a controller; and
   a non-transitory computer storage medium having a computer program encoded thereon that when executed by the controller controls a trailer parking brake status indicator in a tractor, the trailer parking brake status indicator activated when a trailer is coupled to the tractor and a parking brake on the trailer is applied and deactivated when the trailer is coupled to the tractor and the parking brake on the trailer is released, the computer program including code for
      determining, responsive to a signal generated by means for determining whether the trailer is coupled to the tractor and indicative of whether the trailer is coupled to the tractor, whether a conclusive determination was made regarding whether the trailer is coupled to the tractor; and
      executing, when a conclusive determination was not made responsive to the signal regarding whether the trailer is coupled to the tractor, a process including
         determining whether a speed of the tractor when the tractor is in motion meets a predetermined condition relative to a predetermined speed;
         monitoring, in response to determining that the speed of the tractor meets the predetermined condition relative to the predetermined speed, for an activation command to apply the parking brake on the trailer; and
         deactivating the trailer parking brake status indicator responsive to the activation command.

9. The article of manufacture of claim 8 wherein the computer program further includes code for executing the process only when the trailer parking brake status indicator is activated.

10. The article of manufacture of claim 8 wherein the computer program further includes code for executing the process only after an ignition system of the tractor is activated.

11. The article of manufacture of claim 8 wherein the process further includes:
    monitoring, after deactivating the trailer parking brake status indicator, for a deactivation command to release the parking brake on the trailer; and
    activating the trailer parking brake status indicator responsive to the deactivation command.

12. The article of manufacture of claim 8 wherein the process further includes:
    monitoring, after deactivating the trailer parking brake status indicator, for a signal indicating that an ignition system of the tractor is deactivated; and
    activating the trailer parking brake status indicator responsive to the signal.

13. A method for controlling a trailer parking brake status indicator in a tractor, the trailer parking brake status indicator activated when a trailer is coupled to the tractor and a parking brake on the trailer is applied and deactivated when the trailer is coupled to the tractor and the parking brake on the trailer is released, comprising:
    receiving a signal generated by means for determining whether the trailer is coupled to the tractor and indicative of whether the trailer is coupled to the tractor;
    determining, responsive to the signal, whether a conclusive determination can be was made regarding whether the trailer is coupled to the tractor; and
    executing, when a conclusive determination was not made responsive to the signal regarding whether the trailer is coupled to the tractor, a process including
       determining whether a speed of the tractor when the tractor is in motion meets a predetermined condition relative to a predetermined speed;
       monitoring, in response to determining that the speed of the tractor meets the predetermined condition relative to the predetermined speed, for an activation command to apply the parking brake on the trailer; and deactivating the trailer parking brake status indicator responsive to the activation command.

14. The method of claim 13 wherein the determining, monitoring and deactivating steps occur only when the trailer parking brake status indicator is activated.

15. The method of claim 13 wherein the determining, monitoring and deactivating steps occur only after an ignition system of the tractor is activated.

16. The method of claim 13, further comprising:
monitoring, after deactivating the trailer parking brake status indicator, for a deactivation command to release the parking brake on the trailer; and
activating the trailer parking brake status indicator responsive to the deactivation command.

17. The method of claim 13, further comprising:
monitoring, after deactivating the trailer parking brake status indicator, for a signal indicating that an ignition system of the tractor is deactivated; and
activating the trailer parking brake status indicator responsive to the signal.

18. The method of claim 13, further comprising generating the activation command responsive to a user input.

19. The method of claim 18 wherein the activation command is generated only when the user input is active for at least a predetermined period of time.

* * * * *